United States Patent Office 2,894,189
Patented July 7, 1959

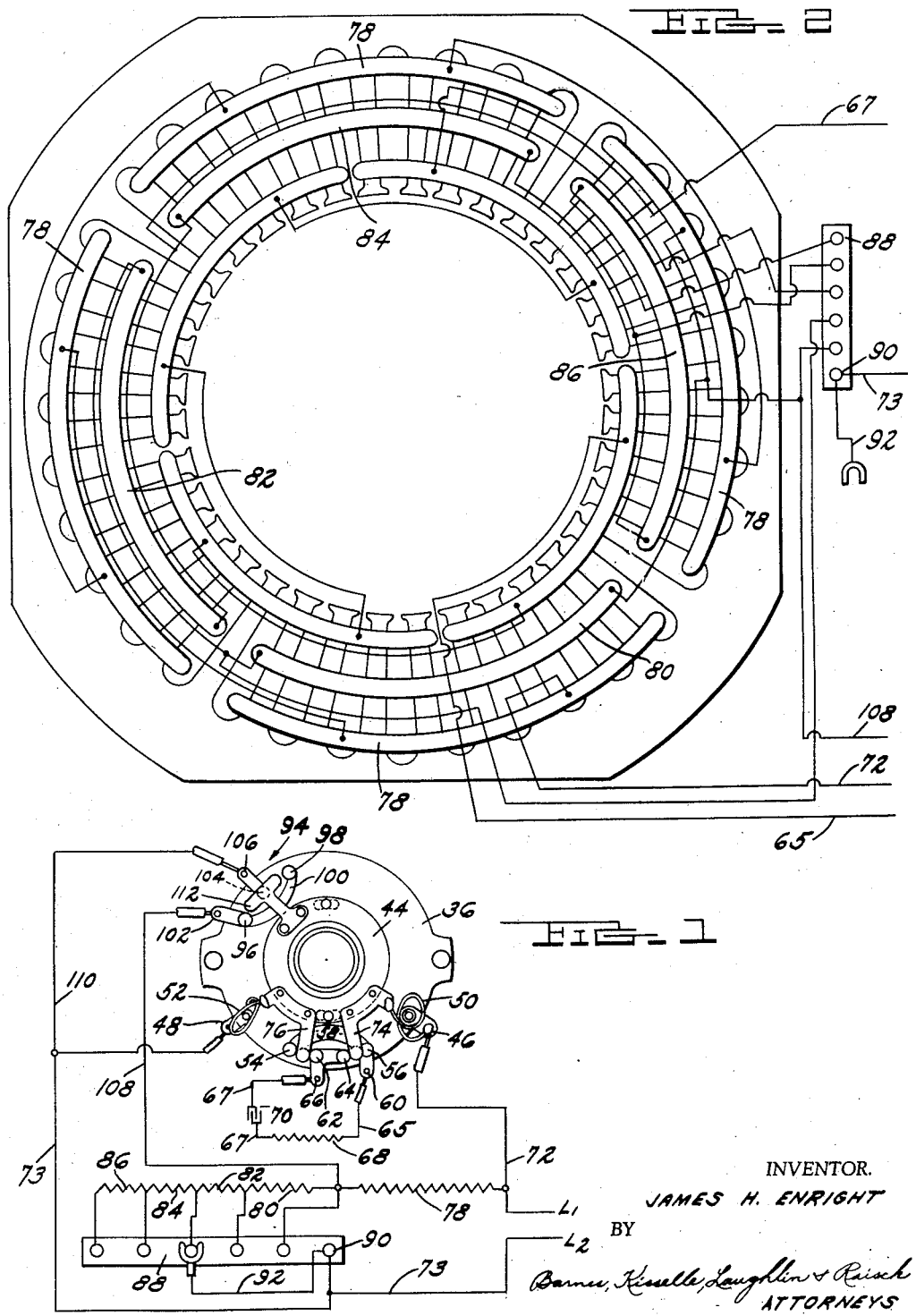

2,894,189

VARIABLE STALL-TORQUE ELECTRIC MOTOR

James H. Enright, Racine, Wis., assignor to In-Sink-Erator Manufacturing Company, Racine, Wis., a corporation of Wisconsin Application December 28, 1956, Serial No. 631,246

7 Claims. (Cl. 318—207)

This invention relates to induction motors and more particularly those of the single-phase type with split-phase starting. Such motors are commonly provided with a starting switch, usually actuated by centrifugal means, which controls the energization of the split-phase starting winding.

Motors of this class may be provided with a combined starting and reversing switch which will function to alternately reverse the direction of motor rotation upon successive starts. This construction is advantageous in applications, such as garbage grinders, where the occurrence of an overload due to a blocking obstacle in the machine will stall the motor causing the centrifugal switch to restart the motor in the opposite direction, thus relieving the block or obstacle which was stalling the motor.

Motors of this type find application in many other uses where the nature of a stalling overload is such that it may be relieved automatically by reversing the rotation of the motor. One application of this type is in power operated closures, such as garage doors. In applying motors of this class to such applications it is advantageous to have the motor stall at a safe torque value so as not to overload the driving mechanism or cause harmful damage to an object which may be acting as an obstruction. This has heretofore been provided by the selection of an appropriate mechanical advantage between the motor and the ultimately driven device. This, however, involves expensive construction if a wide range of overload conditions are to be met.

The present invention is directed to providing an improved electric motor which may be readily adjusted to reverse with any selected maximum value of torque applied during the stall which causes the reversal.

Another object is to provide an improved electric motor having a centrifugal reversing switch which may be more conveniently applied to varying maximum load requirements.

A further object is to provide an improved electric motor wherein the maximum running torque may be selectively varied without altering the effective torque of the motor during starting.

Further objects and advantages of the present invention will be apparent from the following description, reference being had to the accompanying drawing wherein a preferred form of the present invention is clearly shown.

Fig. 1 is a circuit diagram of an electric motor and control switches incorporating a preferred form of the present invention.

Fig. 2 is a diagrammatic end view of a motor stator incorporating the present invention.

In the form of the invention disclosed in the drawing there is utilized a centrifugal switching mechanism of the type disclosed in the patent to Hammes, 2,701,855, issued February 8, 1955, for Reversible Motor and Switch for Garbage Disposal Units. Briefly, such a switch comprises a table plate 36 carrying a plurality of stationary contacts and a movable contact plate 44, which is actuated by the centrifugal mechanism to selectively close the contacts depending upon shaft speed and direction of rotation. As described in the patent, the plate is subjected to a lifting and rotating action which serves to position the contacts alternately upon successive starts in opposite directions of shaft rotation, reference being had to the patent for further disclosure of the mechanism whereby this is accomplished.

As illustrated in Fig. 1, the plate 36 carries a pair of line terminals 46, 48, which have pigtails 50, 52 connected therewith. A pair of stationary contacts 54, 56 are bridged by a jumper 58 and connect with a terminal 60. Another pair of stationary contacts 62, 64 are connected together and to a terminal 66. Terminals 60, 66 connect by conductors 65 and 67 with a starting winding 68 having a capacitor 70 in series therewith. This may be the conventional split-phase starting winding customarily provided in single phase induction motors.

A conductor 72 extends from the line terminal L1 to the terminal 46 and another conductor 73 extends from line L2 to terminal 48. The pig-tails 50, 52 connect with movable contacts 74, 76 mounted upon the shiftable plate 44. In Fig. 1 the contacts 74, 76 are illustrated in mid-position and raised up out of contact with either of the sets of stationary contacts. It will be seen that they are spaced so that they overlie contacts 56 and 62 when the plate 44 is subjected to counter-clockwise shaft rotation. On clockwise shaft rotation the contacts will be shifted to overlie the stationary contacts 54, 64. The action of the centrifugal mechanism is such that with the motor at rest the movable contacts are closed upon one pair of starting contacts so that the motor starts up in such a direction as to first lift the plate 44 and the movable contacts upwardly out of the plane of the paper and then rotate them to overlie the opposite pair of stationary contacts. The contacts will remain open until such time as the motor slows down sufficiently to permit the centrifugal mechanism to lower the plate 44.

The running winding 78 of the motor has one end connected to line conductor 72. Its opposite end is connected to a series of four impedance windings 80, 82, 84 and 86.

As shown in Fig. 2, these are positioned upon the stator coordinately with the four sections of the running winding 78 and serve as additional turns which act to increase the total impedance of the running winding. Connections to the impedance winding are brought out to a terminal board 88 which also has a terminal 90 connected with the line conductor 73. A shiftable tap connection 92 having a suitable terminal may be selectively connected with any of the impedance winding terminals upon the board 88 so as to connect in additional increments of impedance to the running winding, selectively as desired.

For the purpose of shunting the impedance windings during starting there is provided on the centrifugal switch mechanism a shunting switch generally designated as 94. This comprises a pair of stationary contacts 96, 98 having a bridge plate 100 and a stationary terminal 102, all mounted on the table plate 36 together with a stationary contact 104 having a terminal 106. The terminal 102 is connected by a conductor 108 with the lefthand end of running winding 78 and the righthand end of impedance winding 80 as shown in Fig. 1. The terminal 106 is connected by a branch conductor 110 with the line conductor 73. Mounted on the shiftable plate 44 is a movable contact 112 which is adapted to bridge from contact 104 either to contact 96 or contact 98 whenever the centrifugal mechanism lowers the shiftable plate 44.

In operation, assuming the motor to be at rest and the movable contacts 74, 76 to be closed upon stationary contacts 56, 62, the motor will have both the starting and running windings connected together to start in the clockwise direction. Upon closure of the usual line contactor, not shown, current is delivered through the line terminals L1, L2. The starting circuit will include the starting winding 68 and the running winding 78. Thus current flows to the latter from Line L2 and through conductors 73 and 110, centrifugal switch 94, which is now closed, and conductor 108, returning via conductor 72 to line L1. The impedance windings 80 and 82 are effectively shunted by the switch 94.

As soon as the motor comes up to a predetermined speed the shiftable plate 44 is elevated to open the circuit to the starting winding 68. The plate 44 also rotates through a limited angle, due to frictional drag, so that the starting contacts 74, 76 overlie stationary contacts 54, 64 without, however, contacting them.

Should the load device driven by the motor encounter an obstacle, the motor will stall. The value of torque at which the motor stalls depends upon which particular one of the impedance winding terminals is utilized for connection with the pigtail 92. A value of impedance may be selected to suit the characteristics of the load device to which the motor is connected by trying different positions of the pigtail terminal 92 to obtain the most advantageous stalling torque characteristics.

The impedance windings 80 through 84 are only in the circuit during running of the motor when the centrifugal mechanism has raised the plate 44 and opened the shunting switch 94. Because the impedance windings are shunted out during starting, the starting torque is not disturbed by any shifting of the pigtail terminal 92.

It will thus be seen that the present invention provides an improved single phase induction motor having a selectively variable stall-torque which may be varied to suit a range of operating conditions. At the same time the starting operation of the motor is maintained at full value independently of the particular stall-torque performance which may be selected.

While the form of embodiment of the invention as herein disclosed constitutes a preferred form, it is to be understood that other forms might be adopted, all coming within the scope of the claims which follow.

I claim:

1. A variable stall-torque induction motor comprising in combination a main running winding, a starting winding in phase-shifted relation to the running winding, means for varying the stall torque of said motor, said means comprising an auxiliary impedance winding electrically connected to the running winding and having a plurality of adjustable taps, and a centrifugal reversing switch arranged to connect the starting winding in circuit with the running winding, alternately for one and then the other direction of rotation when the motor speed drops below a predetermined value.

2. A variable stall-torque induction motor comprising in combination a main running winding, a starting winding in phase-shifted relation to the running winding, means for varying the stall torque of said motor, said means comprising an auxiliary impedance winding electrically connected to the running winding and having a plurality of adjustable taps, a centrifugal reversing switch arranged to connect the starting winding in circuit with the running winding, first, for one direction of rotation and, secondly, for the opposite direction of rotation when the motor speed drops below a predetermined value, and a second centrifugally actuated switch for shunting the impedance windings when the starting winding is connected in circuit.

3. A single-phase induction motor comprising in combination a starting winding and a running winding in split-phase relation to each other, a centrifugally actuated switch for connecting the starting winding in circuit when the motor is stopped and for disconnecting it when the speed reaches a predetermined value, and means electrically connected to the running winding for selectively varying the impedance thereof to provide any one of a series of values of stall-torque, said centrifugal switch having alternately effective contacts for bringing the starting winding into circuit for opposite rotation upon successive starts.

4. A variable stall-torque induction motor comprising in combination a main running winding, a starting winding in phase-shifted relation to the running winding, means for varying the stall torque of said motor, said means comprising an auxiliary impedance winding electrically connected to the running winding, a centrifugal reversing switch arranged to connect the starting winding in circuit with the running winding, first, for one direction of rotation and, secondly, for the opposite direction of rotation when the motor speed drops below a predetermined value, and a second centrifugally actuated switch for shunting the impedance winding when the starting winding is connected in circuit.

5. A single-phase induction motor comprising in combination a starting winding and a running winding in split-phase relation to each other, a centrifugally actuated switch for connecting the starting winding in circuit when the motor is stopped, for disconnecting it when the speed reaches a predetermined value, and for reconnecting the starting winding for rotation in the opposite direction whenever the motor speed falls below a predetermined value and means associated with the running winding including auxiliary windings wound upon the same motor and having a shiftable connection tap for selective varying the impedance thereof to provide any one of a series of values of stall-torque, and means associated with the centrifugal switch for establishing a minimum impedance connection to the running winding during motor starting.

6. A single-phase induction motor comprising in combination a starting winding and a running winding in split-phase relation to each other, a centrifugally actuated switch for connecting the starting winding in circuit when the motor is stopped and for disconnecting it when the speed reaches a predetermined value, and means electrically connected to the running winding including auxiliary windings wound upon the same motor and having a shiftable connection tap for selectively varying the impedance thereof to provide any one of a series of values of stall-torque, said centrifugal switch having alternately effective contacts for bringing the starting winding into circuit for opposite rotation upon successive starts.

7. A reversible, variable-torque single-phase induction motor comprising a main running winding, an auxiliary impedance winding connected in series with the main running winding, a starting winding connected in phase-shifted relation to the running winding, and a single centrifugal switching device connected to each of said windings for disconnecting said starting winding from said running winding whenever the motor speed exceeds a predetermined value, for reversing the phase-shift relation between said starting and running windings whenever the motor speed drops below said predetermined value, and for effectively shunting said auxiliary impedance winding whenever the motor speed drops below said predetermined value.

References Cited in the file of this patent

UNITED STATES PATENTS

| | | |
|---|---|---|
| 1,280,040 | Jennings | Sept. 24, 1918 |
| 1,726,232 | Kennedy | Aug. 27, 1929 |
| 1,870,229 | Bohn | Aug. 9, 1932 |
| 1,961,776 | Morrill | June 5, 1934 |
| 2,508,143 | Burdett | May 16, 1950 |
| 2,701,855 | Hammes | Feb. 8, 1955 |